(12) United States Patent
Chung (10) Patent No.: US 11,991,952 B2
(45) Date of Patent: May 28, 2024

(54) WALK-BEHIND ELECTRIC GARDENING DEVICE

(71) Applicant: TTI (MACAO COMMERCIAL OFFSHORE) LIMITED, Macau (MO)

(72) Inventor: Koon For Chung, Kwai Chung (HK)

(73) Assignee: Techtronic Cordless GP, Anderson, SC (US)

( * ) Notice: Subject to any disclaimer, the term of this patent is extended or adjusted under 35 U.S.C. 154(b) by 806 days.

(21) Appl. No.: 16/433,141

(22) Filed: Jun. 6, 2019

(65) Prior Publication Data

US 2020/0000023 A1    Jan. 2, 2020

(30) Foreign Application Priority Data

Jun. 29, 2018 (EP) ........................................ 8180959

(51) Int. Cl.
| | | |
|---|---|---|
| *A01D 34/00* | (2006.01) | |
| *A01D 34/69* | (2006.01) | |
| *A01D 69/02* | (2006.01) | |
| *A01D 75/28* | (2006.01) | |
| *A01D 101/00* | (2006.01) | |

(52) U.S. Cl.
CPC ........... *A01D 34/008* (2013.01); *A01D 34/69* (2013.01); *A01D 69/02* (2013.01); *A01D 75/28* (2013.01); *A01D 2101/00* (2013.01)

(58) Field of Classification Search
CPC ...... A01D 34/008; A01D 34/69; A01D 34/46; A01D 34/824; A01D 69/02; A01D 75/28; A01D 2101/00; B62D 51/04; B62D 51/06
See application file for complete search history.

(56) References Cited

U.S. PATENT DOCUMENTS

| | | | | |
|---|---|---|---|---|
| 4,919,224 A | * | 4/1990 | Shyu | G05D 1/0255 701/2 |
| 5,138,824 A | * | 8/1992 | Oshima | A01D 34/6806 56/11.8 |
| 5,402,626 A | | 4/1995 | Zinck | |
| 5,444,965 A | | 8/1995 | Colens | |
| 6,082,083 A | * | 7/2000 | Stalpes | A01D 34/6806 56/11.1 |

(Continued)

FOREIGN PATENT DOCUMENTS

| | | |
|---|---|---|
| CN | 1383711 A | 12/2002 |
| CN | 101008357 A | 8/2007 |
| CN | 201752183 U | 3/2011 |
| CN | 102232331 A | 11/2011 |
| CN | 102232332 A | 11/2011 |

(Continued)

OTHER PUBLICATIONS

Examination Report No. 2 issued by the Australian Government for Application No. 2019204347 dated Nov. 23, 2020 (5 pages).

(Continued)

*Primary Examiner* — Alicia Torres
(74) *Attorney, Agent, or Firm* — Michael, Best & Friedrich LLP (57) ABSTRACT

A walk-behind electric gardening device, comprising: a base unit arranged to move on a surface; a handle assembly connected to the base unit; a tool connected to the base unit for performing gardening operation; a first drive unit operable to propel the base unit; a second drive unit operable to drive the tool; and a switch assembly operable by a user to selectively activate and deactivate the first drive unit.

13 Claims, 8 Drawing Sheets

(56) References Cited

U.S. PATENT DOCUMENTS

| | | | |
|---|---|---|---|
| 6,675,562 B2 | 1/2004 | Lawrence | |
| 6,734,647 B2 * | 5/2004 | Wakitani | A01D 69/02 |
| | | | 318/434 |
| 6,758,030 B2 * | 7/2004 | Dettmann | A01D 34/58 |
| | | | 56/10.8 |
| 6,802,175 B2 * | 10/2004 | Fillman | A01D 34/58 |
| | | | 56/11.9 |
| 8,966,870 B2 * | 3/2015 | MacKinnon | A01D 34/78 |
| | | | 56/10.2 R |
| 9,538,699 B1 | 1/2017 | Bejcek et al. | |
| 2003/0144774 A1 * | 7/2003 | Trissel | A01D 34/008 |
| | | | 701/23 |
| 2010/0275564 A1 * | 11/2010 | Baetica | A01D 34/78 |
| | | | 429/96 |

FOREIGN PATENT DOCUMENTS

| | | | | |
|---|---|---|---|---|
| EP | 1738633 | A2 | 1/2007 | |
| EP | 3326443 | A1 | 5/2018 | |
| EP | 3329762 | A1 | 6/2018 | |
| WO | WO-2004057166 | A2 * | 7/2004 | A01D 34/006 |
| WO | 2017198066 | A1 | 11/2017 | |

OTHER PUBLICATIONS

Extended European Search Report for Application No. 18180959.1 dated Feb. 1, 2019 (8 pages).
Chinese Patent Office Action for Application No. 201910571642.X dated Nov. 19, 2021 (8 pages including statement of relevance).

* cited by examiner

WALK-BEHIND ELECTRIC GARDENING DEVICE

TECHNICAL FIELD

The invention relates to a walk-behind electric gardening device and its method of operation.

BACKGROUND

Walk-behind lawn mowers are known gardening devices that can be manipulated by a user from behind to perform mowing operations. CN204244710U and CN20451.8491U disclose some exemplary lawnmowers. To operation these devices, the user simply activates the motor that rotates the cutting blade, then pushes the mower along the lawn to cut grass using the cutting blade. Continuous operation of these devices could be quite tiring, especially in large scale mowing operations in which the mowing time is long or the mowing area is large.

SUMMARY OF THE INVENTION

The present invention provides a lawn mower, or more generally, a walk-behind electric gardening device, that could overcome or substantially ameliorate the above disadvantage. The present invention also provides a walk-behind electric gardening device with increased operation comfort, and built-in intelligence for improved operation control.

In accordance with a first aspect of the invention, there is provided a walk-behind electric gardening device, comprising: a base unit arranged to move on a surface; a handle assembly connected to the base unit; a first drive unit operable to propel the base unit; and a switch assembly operable by a user to selectively activate and deactivate the first drive unit.

Preferably, the walk-behind electric gardening device also includes a tool connected to the base unit for performing gardening operation; and a second drive unit operable to drive the tool.

The switch assembly may be a control panel, implemented with one or more switches, a touch sensitive display, etc.

The switch assembly may be arranged at least partly on the handle assembly. Additionally or alternatively, the switch assembly may be arranged at least partly on the base unit.

In some embodiments, the first drive unit is arranged to operate at only one fixed speed. In other embodiments, the operation speed of the first drive unit may be changeable or adjustable. The change in the operation speed of the first drive unit may be automatic or manual, in the embodiments in which the operation speed of the first drive unit is changeable, the switch assembly may be further operable by the user to adjust an operation speed of the first drive unit.

The switch assembly may include an on/off switch for selectively activating and deactivating the first drive unit. The switch assembly may include also a speed control switch for changing an operation speed or operation direction of rotation of the first drive unit.

The on/off switch and the speed control switch may be formed by a single switch.

Preferably, the walk-behind electric gardening device also includes a sensing unit having at least one of: a motion sensor arranged to detect motion or orientation of the base unit; and a user-input sensor arranged to detect an input applied by the user on the handle assembly; and a controller, operably connected with the sensing unit and the first drive unit, for controlling operation of the first drive unit based on input received from the sensing unit. More preferably, the sensing unit comprises both the motion sensor and the user-input sensor.

In some embodiments, the controller is further operably connected with the second drive unit for controlling operation of the second drive unit based on input received from the sensing unit.

The controller may control operation of the first drive unit by one or more of: accelerating the first drive unit to a selected speed setting; decelerating the first drive unit to a selected speed setting; operating the first drive unit at a selected speed setting; operating the first drive unit at a speed below a selected maximum speed; operating the first drive unit at a speed above a selected minimum speed; braking the first drive unit; stopping the first drive unit; deactivating the first drive unit; and reversing the first drive unit.

In some embodiments, the switch assembly further includes a speed setting switch for setting one or more of: the selected speed setting, the selected maximum speed, or the selected minimum speed.

In some embodiments, the switch assembly further includes: a mode change switch for switching between an automatic control mode in which the first drive means is controlled using the input from the sensing unit and a manual control mode in which the first drive means is controlled manually by the user through the switch assembly without using the input from the sensing unit.

The on/off switch and the mode change switch may be formed by a single switch.

Preferably, the motion sensor is arranged to detect whether the walk-behind electric gardening device is travelling on: a substantially horizontal surface, a generally upwardly-sloped surface, or a generally downwardly-sloped surface. A substantially horizontal surface can refer to a surface that is entirely flat or generally flat with irregularities. A generally upwardly-sloped surface can refer to an upward slope that is strictly upwards, or has a general upward trend. Likewise, a generally downwardly-sloped surface can refer to a downward slope that is strictly downwards, or has a general downward trend. In some embodiments, the user can calibrate the motion sensor or the controller such that a substantially horizontal surface can refer to a surface with small deviation (e.g., plus or minus 5 degrees) from horizontal. Any other measurement outside this small deviation range would be classified accordingly as a generally upwardly-sloped surface or a generally downwardly-sloped surface.

In some embodiments, the slope of the surface can be determined based on the detection of the motion sensor.

Preferably, the motion sensor comprises one or more of: an inertia measurement unit, an accelerometer, and a gyro sensor.

Preferably, the user-input sensor is arranged to detect one or more of the following inputs: a presence of a hand of the user; a position of a hand of the user, an orientation of a hand of the user; a direction of three exerted on the handle assembly by a hand of the user; and an amount of force exerted on the handle assembly by a hand of the user.

In some embodiments, the user-input sensor is arranged to detect one or more of the following interaction between the user and the walk-behind electric gardening device: pushing of the walk-behind electric gardening device by the user; pulling of the walk-behind electric gardening device by the user; holding of the walk-behind electric gardening device by the user; lifting of a front part of the base unit from the surface; lifting of a left part of the base unit from the surface; lifting of a right part of the base unit from the surface; and lifting of a rear part of the base unit from the surface.

Preferably, the user-input sensor comprises a contact sensor or a contactless sensor. The user-input sensor may include a pressure sensor or a proximity sensor.

In one embodiment, the handle assembly includes a hinge, and the user-input sensor comprises a switch, such as a joystick switch, arranged in the hinge. Alternatively or additionally, the handle assembly includes a hand grip portion, and the user-input sensor comprises a pressure sensor or a proximity sensor arranged in the hand grip portion.

In some embodiments, the base unit includes a deck supported by two or more wheels, and wherein at least two of the wheels are connected with the first drive unit.

The first drive unit may include one or more modular motor and gearbox unit each connected with a respective wheel. Preferably, each of the modular motor and gearbox unit is independently controllable by the controller. In some preferred embodiments, the modular motor and gearbox unit is arranged at least partly, and preferably entirely, outside a footprint of the deck.

In some embodiments, the walk-behind electric gardening device further comprises a load detector for detecting an operation load on the tool; and the controller is further arranged to control operation of the second drive unit based on input from the load detector. The controller may be further arranged to control operation of the first drive unit based on input from the load detector. The load detector may be a detector, or feedback circuit, for detecting a current, voltage, or other electrical operation parameters of the second drive unit. The load detector may be a speed or rotation detector for monitoring a rotation speed or number of rotations of the tool.

In some embodiments, the walk-behind electric gardening device further comprises a movement detector for detecting actual speed of movement of the base unit; and the controller is further arranged to control operation of the first drive unit based on input from the movement detector. The controller may be further arranged to control operation of the second drive unit based on input from the movement detector. The movement detector may be a speed or rotation detector for monitoring a rotation speed or number of rotations of the wheels of the base unit. The movement detector may include a Hall sensor, an optical sensor, etc.

Preferably, the electric gardening device is a DC cordless gardening device.

Preferably, the electric gardening device is a lawnmower.

BRIEF DESCRIPTION OF THE DRAWINGS

Embodiments of the invention will now be described, by way of example, with reference to the accompanying drawings in which.

DETAILED DESCRIPTION OF THE PREFERRED EMBODIMENT

Figure 1:
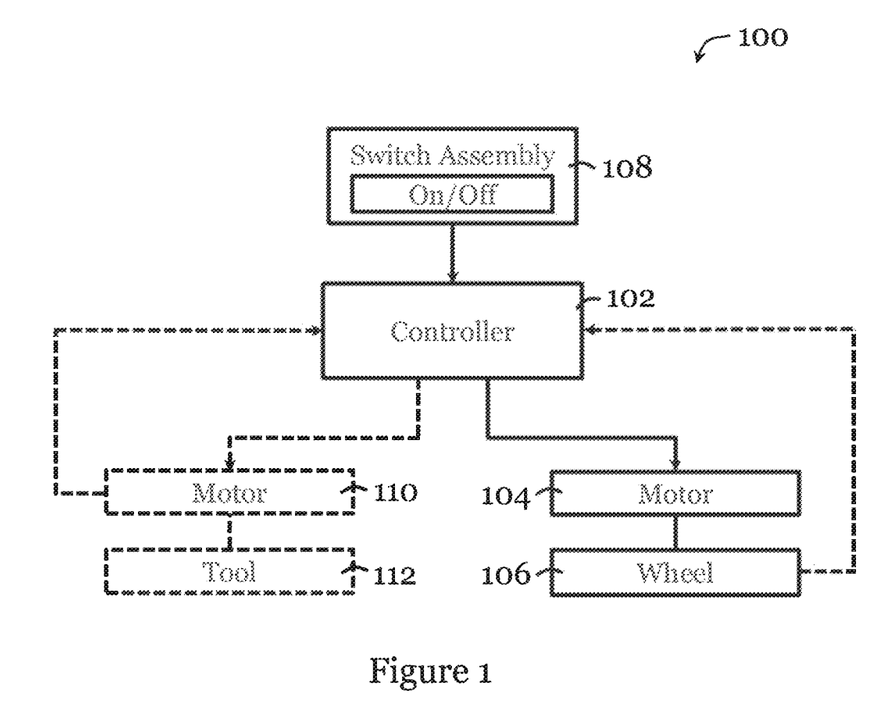
FIG. 1 is a block diagram of a control system of a walk-behind electric gardening device in accordance with one embodiment of the invention.

FIG. 1 shows a control system 100 of a walk-behind electric gardening device, such as a lawnmower. The control system 100 includes a controller 102 (e.g., control circuit) for controlling operation of a motor 104 for the wheel 106 of the device. A switch assembly 108 is operably connected with the controller 102 for controlling its operation. In this embodiment, the switch assembly 108 is arranged to provide on/off function, to selectively activate or deactivate the motor 104 for the wheel 106. In one implementation, the controller 102 includes a processor and an optional memory unit. The processor may be formed by one or more CPU, MCU, controllers, logic circuits, Raspberry Pi chip, etc. The memory unit may include one or more volatile memory unit (such as RAM, DRAM, SRAM), one or more non-volatile unit (such as ROM, PROM, EPROM, EEPROM, FRAM, MRAM, FLASH, SSD, NAND, and NVDIMM), or any of their combinations. The switch assembly 108 includes a paddle-type switch, or like actuator. In this embodiment, the speed of the wheel motor 104 is not adjustable, i.e., it is either on or off. In use, the user may actuate the switch assembly 108 to turn on the wheel motor 104 to provide a controlled forward propelling force to assist movement of the device. The modules shown in FIG. 1 are all operably connected together with one or more power or communication lines.

As shown in FIG. 1, optionally, the controller 102 is also connected with a motor 110 for driving a tool 112 (e.g., cutting blade) to control its operation. The switch assembly 108 may include control for controlling the operation of the tool 112. Such control may include on/off, speed, or mode adjustment. In this embodiment, the motor 110 may provide a feedback to the controller 102 for operation control such that when the load or torque on the motor 110 is large, the power to the motor 110 is increased (up to a safety limit), and vice versa. The feedback control may be in the form of a circuit or a load detector arranged to detect a current, voltage, or other electrical operation parameters of the tool motor 110, or to monitor a rotation speed or number of rotations of the tool 112.

Also, optionally, the device also includes a feedback of the actual operation condition of the wheel 106 to the controller 102, and the controller 102 is operable to control operation of the wheel motor 104 accordingly. Such feedback may be implemented with a speed or rotation detector (e.g., a Hall sensor or optical sensor) that is arranged to monitor a rotation speed or number of rotation of the wheel 106. If it is determined that the user pushes the device too fast/hard while the wheel motor 104 is operating, the device may automatically shut off the wheel motor 104.

Figure 2:
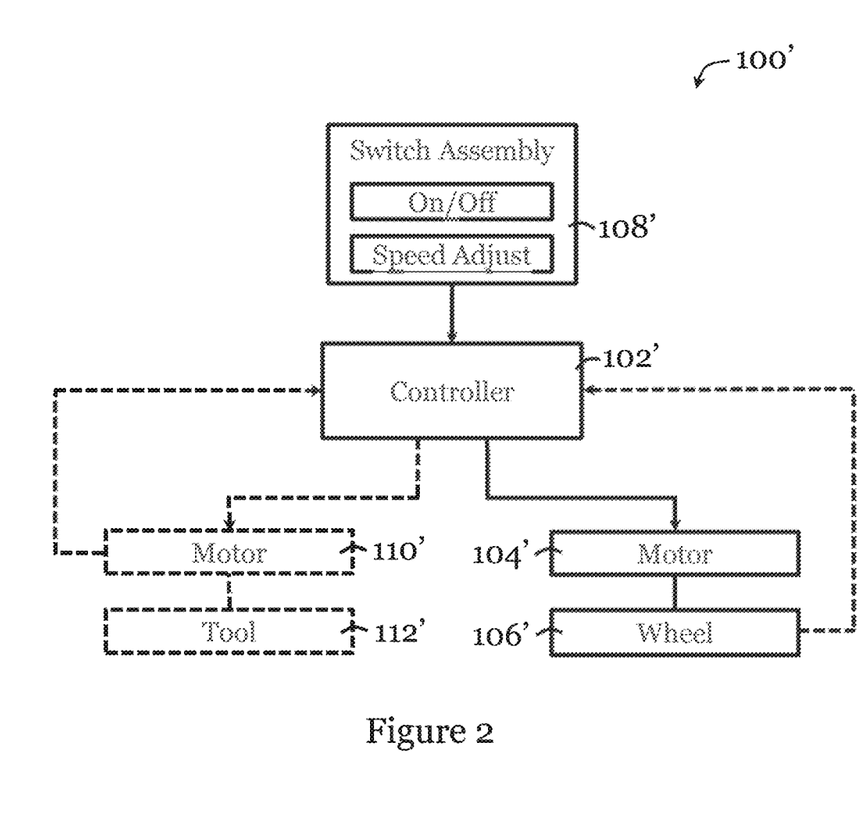
FIG. 2 is a block diagram of a control system of a walk-behind electric gardening device in accordance with another embodiment of the invention.

FIG. 2 shows another control system 100' of a walk-behind electric gardening device in another embodiment of the invention. The control system 100' in FIG. 2 is similar to the control system 100 in FIG. 1 (like components are labelled using like references) and so only their major differences will be described. In FIG. 2, the wheel motor 104' is arranged to operate at different speeds. The switch assembly 108' is arranged to provide, in addition to the on/off function, a speed or mode adjustment function. The speed or mode adjustment function allows the user to selectively control the operation speed of the wheel motor 104'. In one implementation, the switch assembly 108' includes a paddle-type switch, or like actuator, and a separate dial or lever for adjusting the speed of the wheel motor 104'. In use, the user may actuate the switch assembly 108' to turn on the wheel motor 104' and to adjust the speed of operation of the wheel motor 104' (i.e., the extent of propelling force) at will to assist movement of the device.

In the control system 100' of FIG. 2, the wheel feedback control may operate differently when compared to that of FIG. 1. In this embodiment, if it is determined that the user pushes the device too fast/hard while the wheel motor 104' is operating, the device may initially try to increase the wheel motor 104' operation speed, up to a certain speed limit, after which if the user still pushes the device too fast/hard, the device would automatically shut off the wheel motor 104' for safety reasons. Alternatively, if it is determined that the user pushes the device too slow/light while the wheel motor 104' is operating, the device may reduce speed and hence power supplied to the wheel motor 104'.

Figure 3:
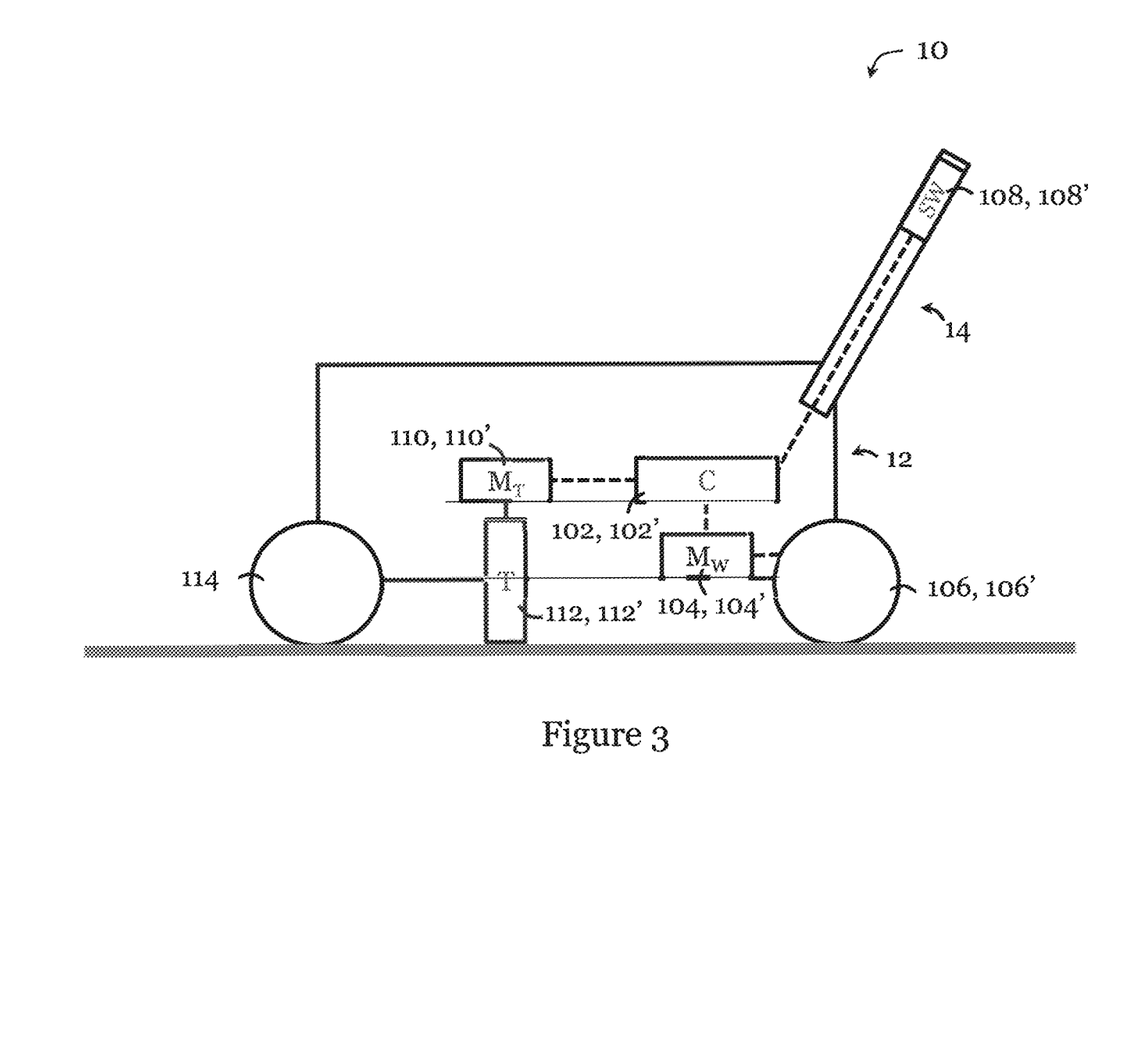
FIG. 3 is a schematic diagram of a walk-behind electric gardening device with the control system of FIG. 1 or 2 in accordance with one embodiment of the invention.

An embodiment of a walk-behind electric gardening device 10 with the control system 100, 100' of FIG. 1 or 2 is shown in FIG. 3. As shown in FIG. 3, the device 10 includes generally a base unit 12 with movement device in the form of wheels and a handle assembly 14 connected to the base unit 12. In this embodiment, the base unit 12 includes two front wheels 114 and two rear wheels 106, 106'. The rear wheels 106, 106' are driving wheels. The tool 112, 112' for performing gardening operation is connected to the bottom part of the base unit 12. The motor 104, 104' for controlling the rear wheel 106, 106', the motor 110, 110' for controlling the tool 112, 112', and the controller 102, 102' are arranged in the base unit 12. The switch assembly 108, 108' is arranged on the handle assembly 14. In use, as the user operates the device 10 from behind, the user can selectively operate the switch assembly 108, 108' to control operation (on/off, speed, etc.) of the wheel motor 104, 104', thereby controlling the provision of an assisting propelling force for moving the device 10 along the surface.

Figure 4:
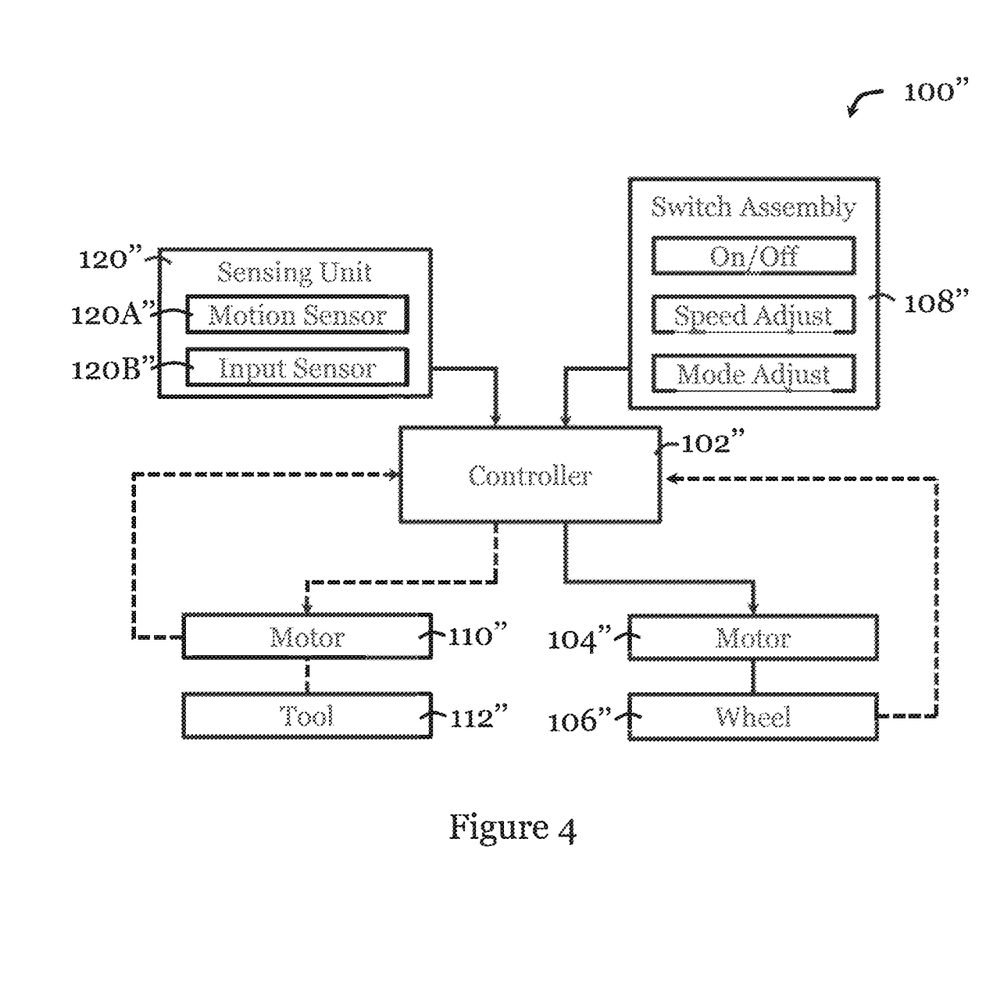
FIG. 4 is a block diagram of a control system of a walk-behind electric gardening device in accordance with yet another embodiment of the invention.

FIG. 4 shows yet another control system 100" of a walk-behind electric gardening device in yet another embodiment of the invention. The control system 100" in FIG. 4 is similar to the control system 100' in FIG. 2 (like components are labelled using like references) and so only their major differences will be described. The control system 100" in FIG. 4 includes a sensing unit 120" operably connected with the controller 102". The controller 102", operably connected with the sensing unit 120", is arranged to control operation of the wheel motor 104" based on input received from the sensing unit 120". In this embodiment, the sensing unit 120" includes a motion sensor 120A" for detecting motion or orientation of the device, as well as a user-input sensor 120B" arranged to detect an input applied by the user on the device.

The motion sensor 120A" may include an inertia measurement unit, an accelerometer, and a gyro sensor. In this embodiment, the motion sensor 120A" is arranged to detect the slope condition on which the gardening device is travelling. For example, the motion sensor 120A" may determine whether the walk-behind electric gardening device is travelling on a substantially horizontal surface, a generally upwardly-sloped surface, or a generally downwardly-sloped surface.

The user-input sensor 120B" may include one or more contact or contactless sensors. In one example, the user-input sensor 120B" includes a pressure sensor or a proximity sensor. The user-input sensor 120B" is arranged to detect: a presence of a hand of the user; a position of a hand of the user, an orientation of a hand of the user; a direction of force exerted on the handle assembly by a hand of the user; and an amount of force exerted on the handle assembly by a hand of the user. In this embodiment, the user-input sensor 120B" is arranged to detect the following interaction between the user and the walk-behind electric gardening device: pushing of the walk-behind electric gardening device by the user; pulling of the walk-behind electric gardening device by the user; holding of the walk-behind electric gardening device by the user; and lifting of a front part of the base unit from the surface.

In response to the detection made by the sensing unit 120", the controller 102" may control operation of the wheel motor 104" by, e.g.: accelerating the wheel motor 104" to a selected speed setting; decelerating the wheel motor 104" to a selected speed setting; operating the wheel motor 104" at a selected speed setting; operating the wheel motor 104" at a speed below a selected maximum speed; operating the wheel motor 104" at a speed above a selected minimum speed; braking the wheel motor 104"; stopping the wheel motor 104"; or deactivating the wheel motor 104".

In the embodiment of FIG. 4, the switch assembly 108" is further arranged to provide a mode adjust function. The mode adjust function allows the user to switch between an automatic control mode in which the wheel motor 104" is controlled using the input from the sensing unit 120" and a manual control mode in which the wheel motor 104" is controlled manually by the user through the switch assembly 108" using the on/off and speed adjust functions without using the input from the sensing unit 120".

Figure 5:
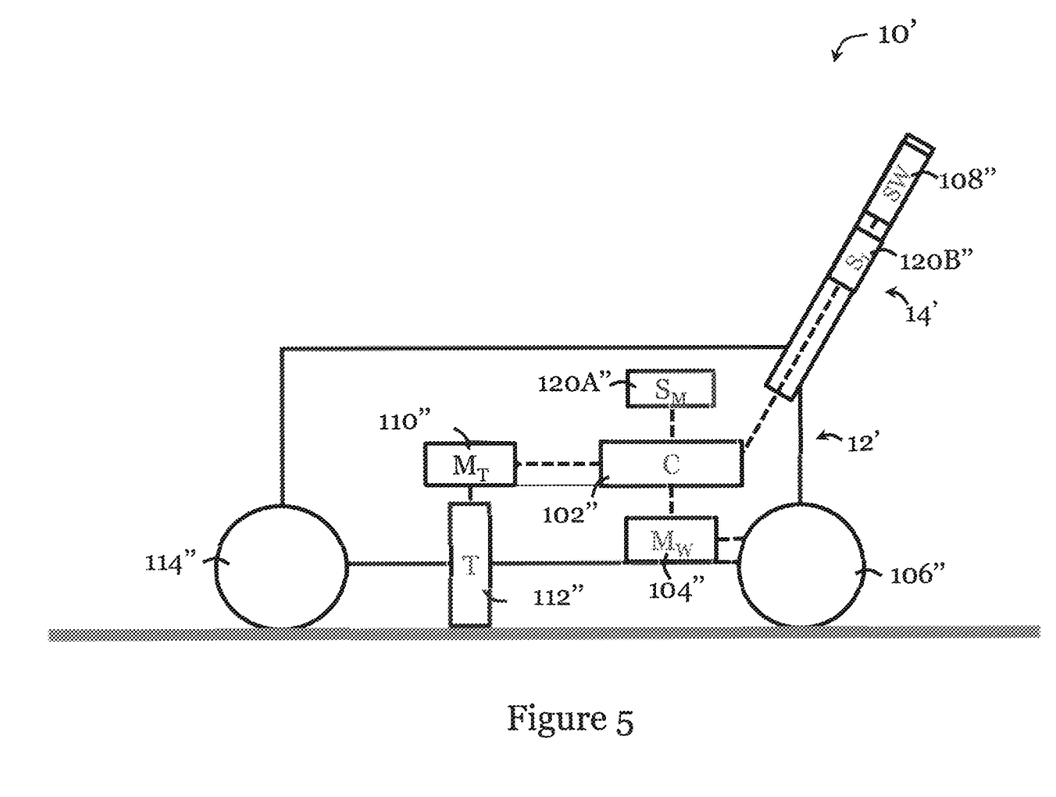
FIG. 5 is a schematic diagram of a walk-behind electric gardening device with the control system of FIG. 4 in accordance with one embodiment of the invention.

An embodiment of a walk-behind electric gardening device 10' with the control system 100" of FIG. 4 is shown in FIG. 5. The device 10' in FIG. 5 is similar to the device 10 in FIG. 3 (like components are labelled using like references) and so only their major differences will be described. In FIG. 5, the user-input sensor 120B" is arranged on the handle assembly 14' and the motion sensor 120A" is arranged in the base unit 12'.

Figure 6:
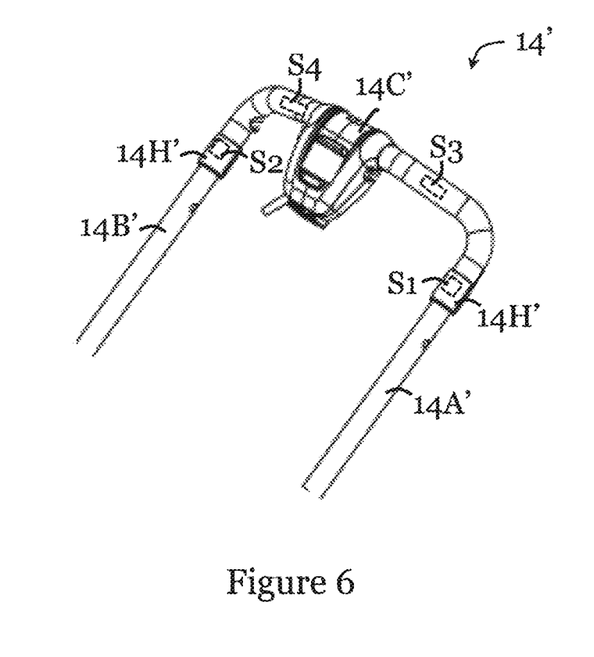
FIG. 6 is a perspective view of a handle of a walk-behind electric gardening device in accordance with one embodiment of the invention.

FIG. 6 shows one embodiment of the handle assembly 14' of FIG. 5. The handle assembly 14' includes two substantially parallel extension bars 14A', 143' connected by a transverse hand-grip portion 14C'. A hinge 14H' is arranged between the extension bars 14A', 14B' and the hand-grip portion 14C'. In this embodiment, a pair of joystick switches S1, S2 is arranged in the hinge 14H' for interpreting whether the user is pushing, pulling, or holding the handle assembly 14' in particular the hand-grip portion 14C'. A pair of pressure/proximity sensors S3, S4 is arranged in the hand grip portion 14C' for determining a position, or a grip force/direction applied by the hands of the user. The controller 102" (FIG. 5) is arranged to process these inputs to determine a suitable control for the wheel motor 104".

Figure 7A:
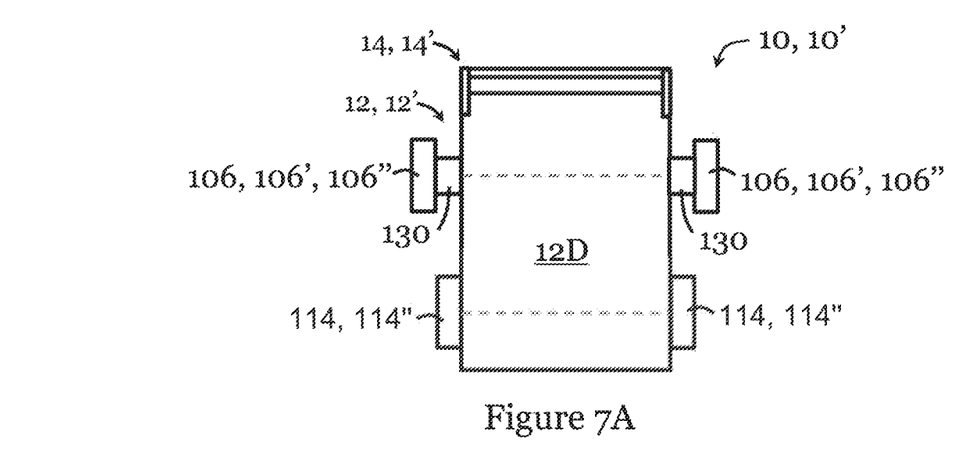
FIG. 7A is a top view of a walk-behind electric gardening device in accordance with one embodiment of the invention.
Figure 7B:
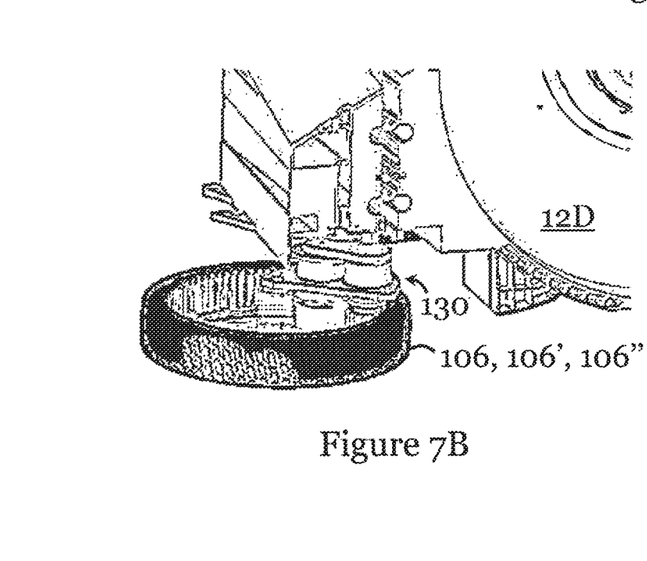
FIG. 7B illustrates a modular drive unit arranged to be used in a walk-behind electric gardening device in accordance with one embodiment of the invention.
Figure 7C:
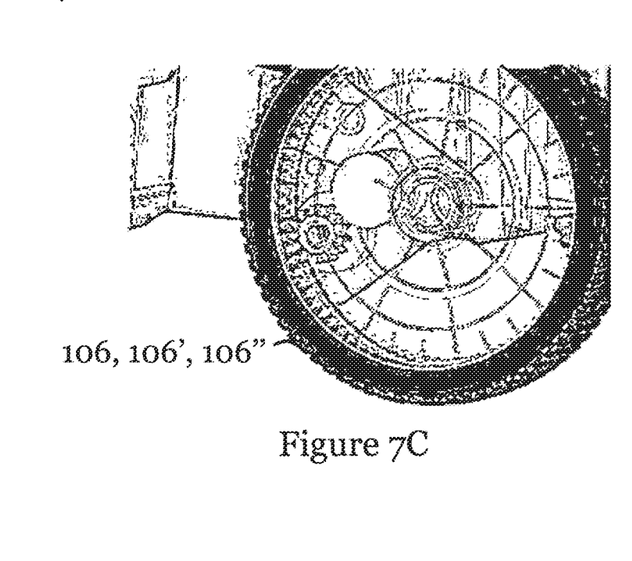
FIG. 7C is another view of the modular drive unit of FIG. 7B.

FIGS. 7A to 7C show a modular drive unit 130 arranged to be used in the walk-behind electric gardening device 10, 10' of FIG. 3 or 5. Referring to FIGS. 7A to 7C, the gardening device 10, 10' includes a base part 12, 12" with a deck 12D supported by two front wheels 114, 114" and two rear wheels 106, 106', 106", and a handle assembly 14, 14' connected to the rear part of the deck 12D. Each of the rear wheels is connected with an independently operable modular drive unit. In the embodiment that the drive unit 130 can rotate in different directions, the device 10, 10' may turn about its own axis, or at least make a sharp turn in tight corners. As shown in FIGS. 7B and 7C, the modular drive unit 130 is a modular motor and gearbox unit arranged largely outside a footprint of the deck 12D. This allows the modular drive unit to be readily detached, replaced, or repaired.

FIGS. 8A to 8F illustrate some exemplary operation of the automatic control mode of the walk-behind electric gardening device 10' of FIG. 5. These examples illustrate the advantage of optimized power utilization as provided by the automatic control mode. It should be appreciated that the automatic control mode is capable of other operations not explicitly described below.

Figure 8A:
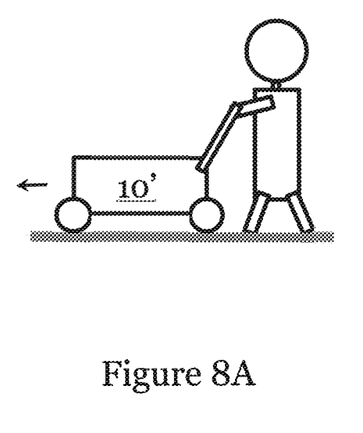
FIG. 8A is an illustration of a first exemplary operation of the walk-behind electric gardening device of FIG. 5.

In FIG. 8A, the device 10' is operated on a substantially horizontal surface. If the device 10' is in the automatic control mode, the motion sensor of the sensing unit would detect that the device 10' is on a substantially horizontal surface. If the user now applies a forward pushing force to the handle assembly, as detected by the user-input sensor of the sensing unit, the controller would increase the speed of the wheel motor to a selected maximum speed setting. Also, depending on the load on the tool motor, as detected by the feedback control, a power supplied to the tool motor may vary. When it is determined that the load is high (in the case of a lawnmower: tall or wet grass), the controller would increase power to the tool motor. Alternatively, when it is determined that the load is low (in the case of a lawnmower: dry or short grass), the controller would reduce power to the tool motor.

Figure 8B:
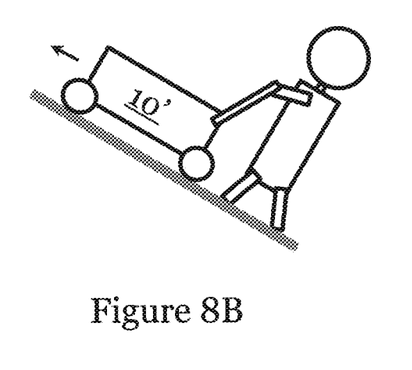
FIG. 8B is an illustration of a second exemplary operation of the walk-behind electric gardening device of FIG. 5.

In FIG. 8B, the device 10' is operated on a generally upwardly-sloped surface. If the device 10' is in the automatic control mode, the motion sensor of the sensing unit would detect that the device 10' is on a generally upwardly-sloped surface. If the user now applies a forward pushing force to the handle assembly, as detected by the user-input sensor of the sensing unit, the controller would increase the speed of the wheel motor to a selected maximum speed setting. Also, depending on the load on the tool motor, as detected by the feedback control, a power supplied to the tool motor may vary. When it is determined that the load is high (in the case of a lawnmower: tall or wet grass), the controller would increase power to the tool motor. Alternatively, when it is determined that the load is low (in the case of a lawnmower: dry or short grass), the controller would reduce power to the tool motor.

Figure 8C:
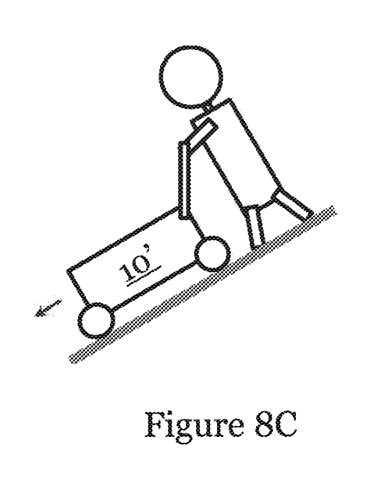
FIG. 8C is an illustration of a third exemplary operation of the walk-behind electric gardening device of FIG. 5.

In FIG. 8C, the device 10' is operated on a generally downwardly-sloped surface. If the device 10' is in the automatic control mode, the motion sensor of the sensing unit would detect that the device 10' is on a generally downwardly-sloped surface. If the user now applies a forward pushing force to the handle assembly, or simply holds the handle assembly, as detected by the user-input sensor of the sensing unit, the controller would increase the speed of the wheel motor to a maximum speed limit for downwardly-sloped surface (smaller than the maximum speed setting in FIG. 8B). If, however, the user now applies a pulling force to the handle assembly, as detected by the user-input sensor of the sensing unit, the controller would stop the wheel motor automatically. In this case, optionally, the controller would also stop the tool motor automatically. Also, depending on the load on the tool motor, as detected by the feedback control, a power supplied to the tool motor may vary. When it is determined that the load is high (in the case of a lawnmower: tall or wet grass), the controller would increase power to the tool motor. Alternatively, when it is determined that the load is low (in the case of a lawnmower: dry or short grass), the controller would reduce power to the tool motor.

Figure 8D:
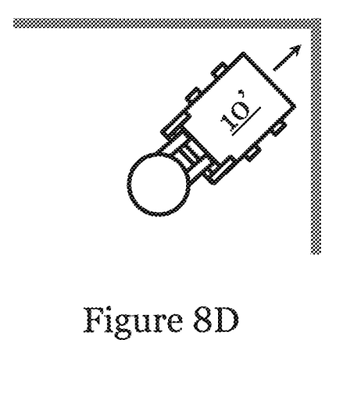
FIG. 8D is an illustration of a fourth exemplary operation of the walk-behind electric gardening device of FIG. 5.

In FIG. 8D, the device 10' is moving into a corner or a dead-end on a substantially horizontal surface. If the device 10' is in the automatic control mode, the motion sensor of the sensing unit would detect that the device 10' is on a substantially horizontal surface. If the user now applies a forward pushing force to the handle assembly, and subsequently, holds the handle assembly (as the device 10' approaches the corner), as detected by the user-input sensor of the sensing unit, the controller would first increase the speed of the wheel motor to a maximum speed limit, then stop the wheel motor when the holding is detected. Also, depending on the load on the tool motor, as detected by the feedback control, a power supplied to the tool motor may vary. When it is determined that the load is high (in the case of a lawnmower: tall or wet grass), the controller would increase power to the tool motor. Alternatively, when it is determined that the load is low (in the case of a lawnmower: dry or short grass), the controller would reduce power to the tool motor.

Figure 8E:
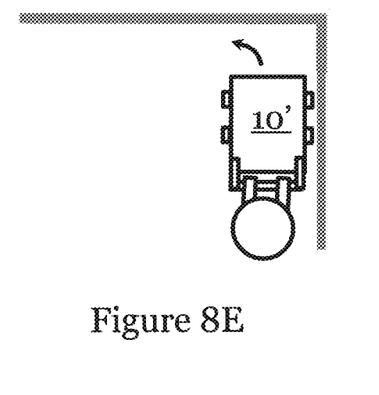
FIG. 8E is an illustration of a fifth exemplary operation of the walk-behind electric gardening device of FIG. 5.

In FIG. 8E, the device 10' is turning at a corner on a substantially horizontal surface. If the device 10' is in the automatic control mode, the motion sensor of the sensing unit would detect that the device 10' is on a substantially horizontal surface. If the user now applies a downward pushing force to the handle assembly and lifts the front wheel, as detected by the user-input sensor of the sensing unit, the controller would stop the wheel motor. Alternatively, if the user now applies a forward pushing force to the handle assembly and subsequently applies a downward pushing force to lift the front wheel, as detected by the user-input sensor of the sensing unit, the controller would first reduce the speed of the wheel motor and then, as the downward pushing force is detected, stop the wheel motor. Also, depending on the load on the tool motor, as detected by the feedback control, a power supplied to the tool motor may vary. When it is determined that the load is high (in the case of a lawnmower: tall or wet grass), the controller would increase power to the tool motor. Alternatively, when it is determined that the load is low (in the case of a lawnmower: dry or short grass), the controller would reduce power to the tool motor.

Figure 8F:
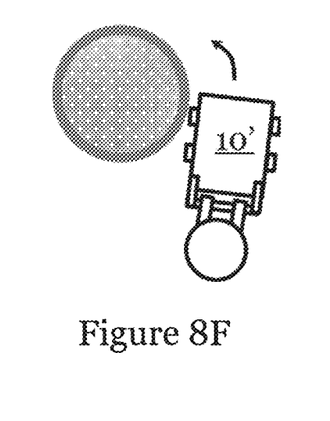
FIG. 8F is an illustration of a sixth exemplary operation of the walk-behind electric gardening device of FIG. 5.

In FIG. 8F, the device 10' is turning generally circumferentially about an obstacle (e.g., tree) on a substantially horizontal surface. If the device 10' is in the automatic control mode, the motion sensor of the sensing unit would detect that the device 10' is on a substantially horizontal surface. If the user now applies a forward pushing force to the handle assembly and subsequently applies a downward pushing force to lift the front wheel, as detected by the user-input sensor of the sensing unit, the controller would first reduce the speed of the wheel motor to a selected speed below the maximum speed. Also, depending on the load on the tool motor, as detected by the feedback control, a power supplied to the tool motor may vary. When it is determined that the load is high (in the case of a lawnmower: tall or wet grass), the controller would increase power to the tool motor. Alternatively, when it is determined that the load is low (in the case of a lawnmower: dry or short grass), the controller would reduce power to the tool motor.

It will be appreciated by persons skilled in the art that numerous variations and/or modifications may be made to the invention as shown and described in the specific embodiments. These variations and/or modifications could well be within the scope of the invention as claimed. Also, features described in different embodiments may be interchanged, combined, etc., to provide further embodiments of the invention. The described embodiments of the invention should be considered in all respects as illustrative, not restrictive.

For example, the walk-behind electric gardening device of the invention may be any type of gardening device that can be operated by the user from behind. Examples include lawnmowers, reel mowers, dethatchers, lawn-edgers, tillers, seed planters, vacuums, paver cleaners, pressure washers, etc. Depending on the type of device, the tool could be a blade, a suction assembly, a cutting disc, a dispensing mechanism, a blower assembly, etc. The walk-behind electric gardening device can take any form, with additional or alternative components. The base unit of the electric gardening device can include a body, deck, or the like, supported by movement device for movement on a surface. The movement device includes one or more driving wheels, and may further include one or more driven wheels. The driving wheels may be at the front of the device (front wheel drive), at the rear of the device (rear wheel drive), or both. The drive for the base unit may be a motor or other prime mover, optionally with gearbox and/or clutch. The motor may be AC motor. DC motor, or AC/DC hybrid motor. Exemplary motors include a brushless motor, a brushed motor, a fusion brushed motor, a fusion brushless motor, a fusion hybrid brushed motor, etc., with a voltage rating of, e.g., 18V, 36V, 72V. The drive for the tool may also be any types of motor or prime mover, including those described above. The handle assembly can take any form, shape, and size. For example, it may be fixed, rotatable, telescopic, collapsible, etc. The gardening device may be operated with AC power (with a power cord for connection to the mains), with DC power (one or more battery packs, connected in series, parallel, or both), hybrid AC/DC power, etc. The battery packs may have a nominal voltage of 18V, 36V, 72V, etc. The switch assembly may be implemented with one or more switches or actuators. For example, the switch may include one or more of: a paddle, a lever, a trigger, a knob, a dial, a toggle switch, a push button, a slide switch, a foot pedal, a foot switch, etc. Non-contact switch that are of optical-type, electrical-type, electromagnetic-type, capacitive-type, etc., can also or alternatively be used. The switch assembly may also be implemented digitally, e.g., through a touch sensitive control screen or the like arranged on the handle assembly of the gardening device.

The invention claimed is:

1. A walk-behind electric gardening device, comprising:
 a base unit arranged to move on a surface;
 a handle assembly connected to the base unit;
 a tool connected to the base unit for performing gardening operation;
 a first electric drive unit operable to propel the base unit;
 a second electric drive unit operable to drive the tool;
 a sensing unit including one or both of:
  a motion sensor arranged to detect motion or orientation of the base unit; and
  a user-input sensor arranged to detect an input applied by the user on the handle assembly;
 a controller, operably connected with the sensing unit and the first electric drive unit, for controlling operation of the first electric drive unit based on input received from the sensing unit;
 a switch assembly operable by a user to selectively activate or deactivate the first electric drive unit, the switch assembly further operable by a user to selectively control the first electric drive unit in response to detection of motion or orientation of the base unit by the motion sensor,
 wherein the switch assembly further includes:
  a mode change switch configured to switch between
   an automatic control mode in which the first electric drive unit is controlled using the input from the sensing unit when the electric gardening device is in the automatic control mode, and
   a manual control mode in which the first electric drive unit is controlled manually by the user through the switch assembly without using the input from the sensing unit.

2. The walk-behind electric gardening device of claim 1, wherein an operation speed of the first electric drive unit is changeable.

3. The walk-behind electric gardening device of claim 2, wherein the switch assembly is further operable by the user to adjust the operation speed of the first electric drive unit.

4. The walk-behind electric gardening device of claim 1, wherein the controller is arranged to control the operation of the first electric drive unit by one or more of:
 accelerating the first electric drive unit to a selected speed setting;
 decelerating the first electric drive unit to a selected speed setting;
 operating the first electric drive unit at a selected speed setting;
 operating the first electric drive unit at a speed below a selected maximum speed;
 operating the first electric drive unit at a speed above a selected minimum speed;
 braking the first electric drive unit;
 stopping the first electric drive unit; and
 deactivating the first electric drive unit.

5. The walk-behind electric gardening device of claim 1, wherein the motion sensor is arranged to detect whether the walk-behind electric gardening device is travelling on: a substantially horizontal surface, a generally upwardly-sloped surface, or a generally downwardly-sloped surface.

6. The walk-behind electric gardening device of claim 1, wherein the motion sensor comprises one or more of: an inertia measurement unit, an accelerometer, and a gyro sensor.

7. The walk-behind electric gardening device of claim 1, wherein the user-input sensor is arranged to detect one or more of the following inputs:

a presence of a hand of the user;

a position of a hand of the user, an orientation of a hand of the user;

a direction of force exerted on the handle assembly by a hand of the user; and an amount of force exerted on the handle assembly by a hand of the user.

8. The walk-behind electric gardening device of claim 1, wherein the user-input sensor comprises a pressure sensor or a proximity sensor.

9. The walk-behind electric gardening device of claim 1, wherein the base unit includes a deck supported by two or more wheels, and at least two of the wheels are connected with the first electric drive unit.

10. The walk-behind electric gardening device of claim 9, wherein the first electric drive unit comprises modular motor and gearbox units each connected with a respective wheel, and wherein the modular motor and gearbox units are arranged at least partly outside a footprint of the deck.

11. The walk-behind electric gardening device of claim 1, further comprising a load detector for detecting an operation load on the tool; and the controller is further arranged to control operation of the second electric drive unit based on input from the load detector.

12. A walk-behind electric gardening device, comprising:
a base unit arranged to move on a surface;
a handle assembly connected to the base unit;
a tool connected to the base unit for performing gardening operation;
a first electric drive unit operable to propel the base unit;
a second electric drive unit operable to drive the tool;
a switch assembly is operable by a user to selectively activate and deactivate the first electric drive unit;
a sensing unit including one or both of:
a motion sensor arranged to detect motion or orientation of the base unit; and
a user-input sensor arranged to detect an input applied by the user on the handle assembly; and
a controller, operably connected with the sensing unit and the first electric drive unit, configured to control operation of the first electric drive unit based on input received from the sensing unit, the input received from the sensing unit including the input from the user-input sensor involving actuation of the switch assembly to move the base unit on the surface in response to the input applied by the user on the handle assembly;
a movement detector for detecting actual speed of movement of the base unit; and
wherein the controller is further arranged to control the operation of the first electric drive unit based on input from the movement detector.

13. The walk-behind electric gardening device of claim 1, wherein the electric gardening device is a DC cordless gardening device.

* * * * *